US009653037B2

United States Patent
Imaoku et al.

(10) Patent No.: US 9,653,037 B2
(45) Date of Patent: May 16, 2017

(54) OPTICAL DEVICE AND DISPLAY DEVICE PROVIDED WITH SAME

(71) Applicant: Sharp Kabushiki Kaisha, Osaka-shi, Osaka (JP)

(72) Inventors: Takao Imaoku, Osaka (JP); Iori Aoyama, Osaka (JP); Tsuyoshi Inoue, Osaka (JP); Hiroyuki Moriwaki, Osaka (JP); Eiji Satoh, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 152 days.

(21) Appl. No.: 14/436,148

(22) PCT Filed: Oct. 7, 2013

(86) PCT No.: PCT/JP2013/077243
§ 371 (c)(1),
(2) Date: Apr. 16, 2015

(87) PCT Pub. No.: WO2014/061492
PCT Pub. Date: Apr. 24, 2014

(65) Prior Publication Data
US 2015/0287380 A1  Oct. 8, 2015

(30) Foreign Application Priority Data
Oct. 17, 2012  (JP) .................. 2012-230188

(51) Int. Cl.
G09G 3/36  (2006.01)
G02F 1/19  (2006.01)
G02F 1/17  (2006.01)

(52) U.S. Cl.
CPC ........... *G09G 3/3696* (2013.01); *G02F 1/172* (2013.01); *G02F 1/19* (2013.01); *G09G 3/3651* (2013.01);
(Continued)

(58) Field of Classification Search
None
See application file for complete search history.

(56) References Cited

U.S. PATENT DOCUMENTS 6,665,042 B1  12/2003  Marshall et al.
6,829,075 B1  12/2004  Kosc et al.
(Continued)

FOREIGN PATENT DOCUMENTS

JP  2007-506152 A  3/2007
WO  2013/108899 A1  7/2013

*Primary Examiner* — Joseph Haley
*Assistant Examiner* — Emily Frank
(74) *Attorney, Agent, or Firm* — Keating & Bennett, LLP

(57) ABSTRACT

An optical device (100) includes a first substrate (10) and a second substrate (20), and an optical layer (30) interposed therebetween. The first substrate includes a first electrode (11) and a second electrode (12), and the second substrate includes a third electrode (21). The optical layer contains a medium (31) and anisotropically-shaped particles (32) whose alignment direction changes in accordance with the direction of an electric field applied to the optical layer. The first electrode and the second electrode, which are interdigitated electrodes, are disposed so that their respective branches (11a, 12a) mesh with one another via a predetermined interspace. The relationships $w_1 < l$, $w_2 < l$ and $g \le l \le w_1 + w_2 + g$ are satisfied, where $w_1$ is the width of each branch of the first electrode, $w_2$ is the width of each branch of the second electrode, g is the predetermined interspace, and l is the length of the anisotropically-shaped particles.

15 Claims, 8 Drawing Sheets

(52) U.S. Cl.
CPC .................. *G02F 2201/124* (2013.01); *G09G 2320/0233* (2013.01)

(56) References Cited

U.S. PATENT DOCUMENTS

| | | | |
|---|---|---|---|
| 2007/0080370 A1* | 4/2007 | Miyachi | G02F 1/13624 257/107 |
| 2007/0159678 A1 | 7/2007 | Verhaegh et al. | |
| 2008/0165101 A1* | 7/2008 | Kim | G09G 3/3696 345/87 |
| 2010/0171903 A1* | 7/2010 | Okuyama | G02B 6/0041 349/65 |
| 2013/0033741 A1* | 2/2013 | Mori | G02F 1/172 359/296 |
| 2014/0333991 A1 | 11/2014 | Satoh et al. | |

\* cited by examiner (a)

(b)

WHEN LATERAL FIELD IS APPLIED

WHEN LONGITUDINAL FIELD IS APPLIED (a)

(b)

(a)

(b)

(a)

(b)

OPTICAL DEVICE AND DISPLAY DEVICE PROVIDED WITH SAME

TECHNICAL FIELD

The present invention relates to an optical device, and more particularly to an optical device including an optical layer which contains anisotropically-shaped particles. Moreover, the present invention relates to a display device including such an optical device.

BACKGROUND ART

An optical device which controls the transmittance (or reflectance) of incident light needs a high contrast ratio and a high efficiency of light utilization.

One well-known optical device for controlling transmittance of light with voltage application is the liquid crystal panel. A liquid crystal panel includes a pair of substrates and a liquid crystal layer which is provided between these substrates. In a liquid crystal panel, liquid crystal molecules within the liquid crystal layer undergo changes in their alignment depending on the level of voltage being applied across the liquid crystal layer, which results in changes in the transmittance of light entering the liquid crystal panel. Liquid crystal panels have a very high contrast ratio, and therefore are widely used in display devices.

However, many liquid crystal panels are of the type that employs polarizers; therefore, half or more of the light which is utilized for displaying is absorbed at the polarizers. This results in a low efficiency of light utilization. Accordingly, development of optical devices which do not require polarizers has been under way in the recent years.

Patent Documents 1 and 2 disclose an optical device including a suspension layer which contains polymer flakes. In this optical device, the polymer flakes can be rotated with application of an electric field to the suspension layer, whereby the optical characteristics of the suspension layer are altered.

Patent Document 3 discloses a transflective display including a suspension layer which contains reflective particles. FIG. 9 shows a suspended particle device 800 which is used in the transflective display that is disclosed in Patent Document 3.

As shown in FIG. 9, the suspended particle device 800 includes a suspension layer 830 containing reflective particles 832 such as metal particles. The suspension layer 830 is provided between an electrically insulative substrate 810 and a transparent plate 820. On the sides of the electrically insulative substrate 810 and the transparent plate 820 that face the suspension layer 830, ITO layers 811 and 821 are formed as electrodes.

Spacers 860a and 860b are provided between the electrically insulative substrate 810 and the transparent plate 820. On the respective side faces of the spacers 860a and 860b, ITO layers 870a and 870b are formed as electrodes. Passivation layers 880a, 880b, 880c, and 880d of $SiO_2$ electrically isolate the ITO layers 870a and 870b from the ITO layers 811 and 821 that are on the electrically insulative substrate 810 and the transparent plate 820.

When a voltage is applied between the ITO layers 811 and 821, the reflective particles 832 will align so that their longitudinal direction runs parallel to the direction of the electric field, i.e., so that their longitudinal direction is perpendicular to the substrate plane. As a result of this, the transmittance of the suspension layer 830 increases.

On the other hand, when a voltage is applied between the ITO layers 870a and 870b formed on the side faces of the spacers 860a and 860b, the reflective particles 832 will align so that their longitudinal direction runs parallel to the direction of the electric field, i.e., so that their longitudinal direction is parallel to the substrate plane. As a result of this, the reflectance of the suspension layer 830 increases (and its transmittance decreases). Thus, the suspended particle device 800 experiences changes in transmittance and reflectance as the direction of the applied field is changed.

The optical devices of Patent Documents 1 and 2 and the suspended particle device 800 of Patent Document 3 mentioned above do not require polarizers, and therefore can attain a higher efficiency of light utilization than that of a liquid crystal panel.

CITATION LIST

Patent Literature

[Patent Document 1] the specification of U.S. Pat. No. 6,665,042
[Patent Document 2] the specification of U.S. Pat. No. 6,829,075
[Patent Document 3] Japanese National Phase PCT Laid-Open Publication No. 2007-506152

SUMMARY OF INVENTION

Technical Problem

However, the optical devices of Patent Documents 1 and 2, in which application of an electric field causes the polymer flakes to transition from being parallel to the substrate plane to being perpendicular to the substrate, or from being perpendicular to the substrate to being parallel to the substrate, rely on thermal dispersion or gravity in order to cause opposite changes. This leads to a problem in that sufficient response speed cannot be obtained, which makes its use for a display device difficult.

On the other hand, the suspended particle device 800 of Patent Document 3 has a problem of complicated processes in forming the electrodes. Specifically, the ITO layers 870a and 870b that extend along the cell thickness direction need to be formed as electrodes on the side faces of the spacers 860a and 860b, which presents high difficulties in the actual formation of the electrodes.

The present invention has been made in view of the above problems, and an objective thereof is to provide an optical device which can achieve a high contrast ratio and a high efficiency of light utilization with a simple constitution, and a display device including the same.

Solution to Problem

An optical device according to an embodiment of the present invention is an optical device comprising: a first substrate and a second substrate opposing each other, and an optical layer interposed between the first substrate and the second substrate, the first substrate including a first electrode and a second electrode; the second substrate including a third electrode opposing the first electrode and the second electrode; the optical layer containing a medium and anisotropically-shaped particles dispersed in the medium, the anisotropically-shaped particles having shape anisotropy; each of the first electrode and the second electrode being an interdigitated electrode having a plurality of branches; the first electrode and the second electrode being disposed so that the respective pluralities of branches mesh with one another via a predetermined interspace, wherein, an alignment direction of the anisotropically-shaped particles changes in accordance with a direction of an electric field applied to the optical layer; and the relationships $w_1<l$, $w_2<l$ and $g \le l \le w_1+w_2+g$ are satisfied, where $w_1$ is a width of each of the plurality of branches of the first electrode, $w_2$ is a width of each of the plurality of branches of the second electrode, g is the predetermined interspace, and l is a length of the anisotropically-shaped particles.

In one embodiment, the relationships $w_1 \le l \le 1.8$ g and $w_2 \le l \le 1.8$ g are satisfied.

In one embodiment, the alignment direction of the anisotropically-shaped particles differs depending on whether a longitudinal field is generated in the optical layer by the first electrode and second electrode and the third electrode or a lateral field is generated in the optical layer by the first electrode and the second electrode.

In one embodiment, when a longitudinal field is generated in the optical layer, the anisotropically-shaped particles align substantially perpendicular to a substrate plane of the first substrate; and when a lateral field is generated in the optical layer, the anisotropically-shaped particles align substantially parallel to the substrate plane of the first substrate.

In one embodiment, a dielectric constant $\in_p$ of the anisotropically-shaped particles and a dielectric constant $\in_m$ of the medium are unequal.

In one embodiment, the dielectric constant $\in_m$ of the medium is greater than the dielectric constant $\in_p$ of the anisotropically-shaped particles by 1 or more.

In one embodiment, the anisotropically-shaped particles are light reflective.

In one embodiment, the anisotropically-shaped particles are in flake form.

A display device according to an embodiment of the present invention comprises an optical device having the above construction.

In one embodiment, the above display device has a plurality of pixels in a matrix array, wherein, for each of the plurality of pixels, the first substrate includes the first electrode and the second electrode.

In one embodiment, the above display device is capable of displaying in a reflection mode by utilizing light which is incident from the exterior.

In one embodiment, one of the first substrate and the second substrate that is located on a rear face side includes an optical absorption layer which absorbs light.

In one embodiment, the above display device further comprises a backlight provided at a rear face side of the optical device, the display device being capable of displaying in a transmission mode by utilizing light which is radiated from the backlight toward the optical device.

Advantageous Effects of Invention

According to an embodiment of the present invention, there is provided an optical device which can achieve a high contrast ratio and a high efficiency of light utilization with a simple constitution and a display device including the same.

DESCRIPTION OF EMBODIMENTS

Hereinafter, embodiments of the present invention will be described with reference to the drawings. Note that the present invention is not limited to the following embodiments.

(Embodiment 1: Reflection Type Display Device)

Figure 1:
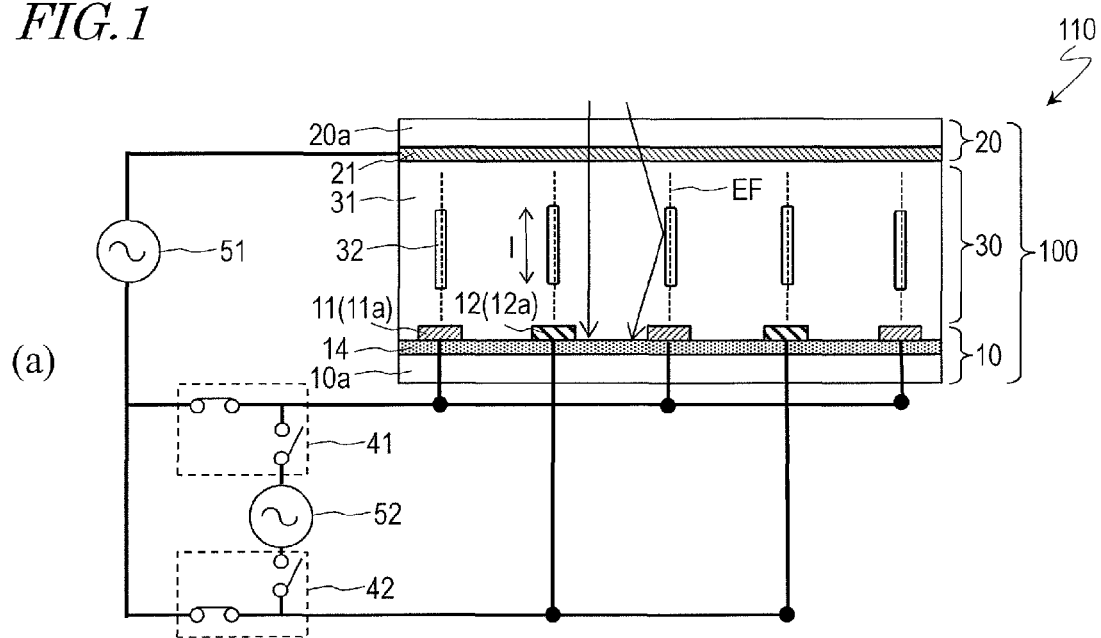
FIGS. 1 (a) and (b) are cross-sectional views schematically showing a display device 110 according to an embodiment of the present invention, where: (a) illustrates a state where a longitudinal field is applied to an optical layer 30; and (b) shows a state where a lateral field is applied to the optical layer 30.
Figure 1:
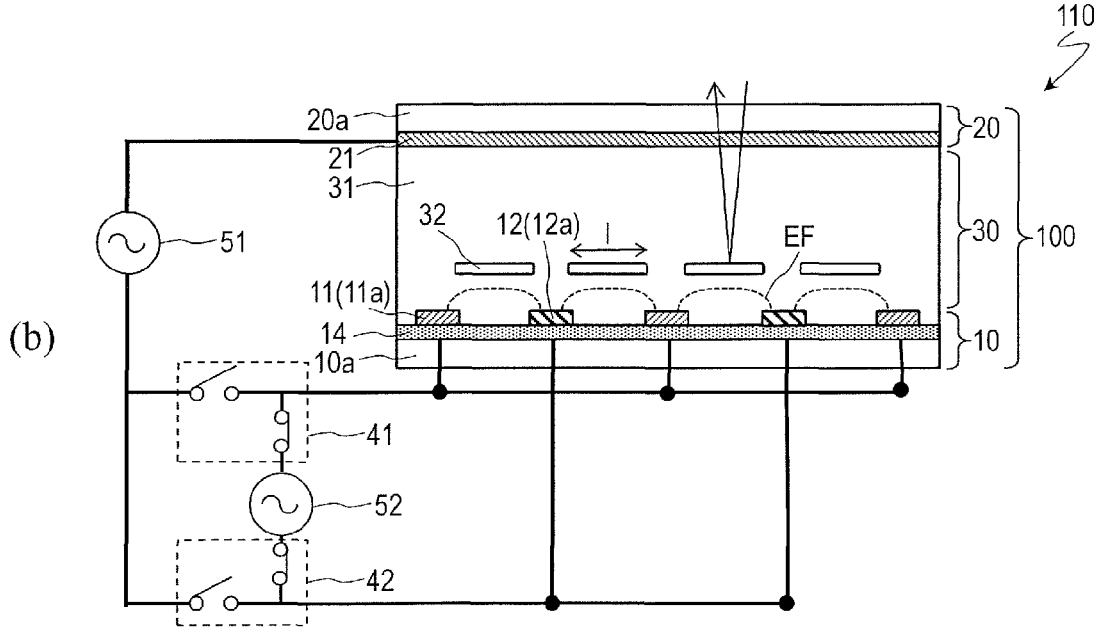

FIGS. 1(a) and (b) show a display device 110 according to the present embodiment. FIGS. 1(a) and (b) are cross-sectional views schematically showing the display device 110.

The display device 110 is a reflection type display device that can perform displaying in a reflection mode by utilizing light which is incident from the exterior (ambient light). As shown in FIGS. 1(a) and (b), the display device 110 includes a display panel (optical device) 100, and has a plurality of pixels in a matrix array.

The display panel 100 includes a first substrate 10 and a second substrate 20 opposing each other, and an optical layer (display medium layer) 30 which is provided between the first substrate 10 and the second substrate 20. Between the first substrate 10 and the second substrate 20, the first substrate 10 that is relatively located on the rear face side may hereinafter be referred to as the "rear substrate", whereas the second substrate 20 that is relatively located on the front face side (i.e., the viewer's side) may hereinafter be referred to as the "front substrate".

Figure 2:
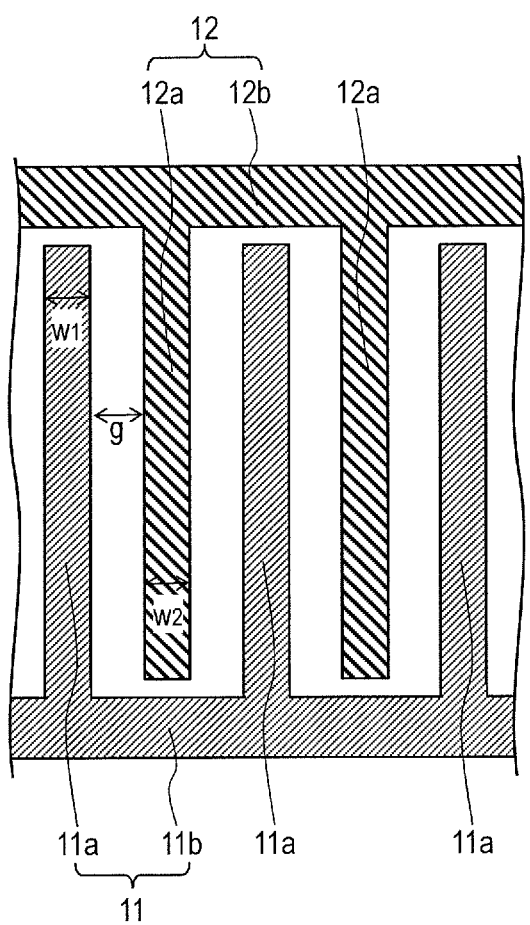
FIG. 2 A plan view schematically showing a first electrode 11 and a second electrode 12 which are interdigitated electrodes.

The first substrate (rear substrate) 10 includes first electrodes 11 and second electrodes 12. A first electrode 11 and a second electrode 12 are provided for each of the plurality of pixels. Having a plurality of branches 11a and 12a, each first electrode 11 and each second electrode 12 constitute interdigitated electrodes. FIG. 2 shows a planar structure of a first electrode 11 and a second electrode 12.

As shown in FIG. 2, each first electrode 11 includes a stem 11b and a plurality of branches 11a extending from the stem 11b. Similarly, each second electrode 12 includes a stem 12b and a plurality of branches 12a extending from the stem 12b. The first electrode 11 and the second electrode 12 are disposed so that their respective branches 11a and 12a mesh with one another via a predetermined interspace (which hereinafter may be referred to as the "interelectrode distance") g.

The first substrate 10 is an active matrix substrate, including a switching element (e.g. a thin film transistor (TFT)) provided for each pixel and also various wiring lines (e.g., scanning lines for supplying scanning signals to the TFTs and signal lines for supplying display signals to the TFTs) (neither of them is shown here). One of the first electrode 11 and the second electrode 12 is electrically connected to the switching element so as to receive a voltage corresponding to a display signal via the switching element. That is, the one of the interdigitated electrodes that is connected to the switching element can have a different voltage applied thereto, depending on the pixel. Meanwhile, the other interdigitated electrode is electrically connected to a common wiring line which is formed around the displaying region, so as to receive a voltage which is common to the plurality of pixels. Thus, one of the first electrode 11 and second electrode 12 can function as a pixel electrode, while the other can function as a common electrode.

The first substrate 10 further includes an optical absorption layer 14 that absorbs light. There is no particular limitation as to the material of the optical absorption layer 14. As the material of the optical absorption layer 14, pigments can be used, for example, which are used as the material of a black matrix, etc., that is included in the color filters of a liquid crystal display device or the like. Alternatively, as the optical absorption layer 14, a low-reflection chromium film of double-layer structure (i.e., having a structure in which a chromium layer and a chromium oxide layer are stacked) can also be used.

The component elements of the first substrate 10 (i.e., the aforementioned first electrodes 11, second electrodes 12, optical absorption layer 14, and so on) are supported by a substrate 10a which is electrically insulative (e.g., a glass substrate). Although FIGS. 1(a) and (b) illustrate the optical absorption layer 14 as being provided at the optical layer 30 side of the substrate 10a, the optical absorption layer 14 may alternatively be provided at the rear face side of the substrate 10a.

The second substrate (front substrate) 20 includes a third electrode(s) 21 opposing the first electrodes 11 and the second electrodes 12. The third electrode(s) 21 is a so-called spread electrode that does not have any slits or bevels formed therein. It is not necessary that an electrically independent third electrode 21 be provided for each pixel, but a single continuous electrically conductive film may commonly be provided for the plurality of pixels. The third electrode(s) 21 can function as a common electrode. In the case of conducting multicolor displaying, the second substrate 20 further includes color filters (not shown).

The component elements of the second substrate 20 (the aforementioned third electrode(s) 21 and the like) are supported on an electrically insulative substrate (e.g., glass substrate) 20a.

The first electrodes 11, the second electrodes 12, and the third electrode(s) 21 are each made of a transparent electrically conductive material such as ITO (indium tin oxide) or IZO (indium zinc oxide). There is no particular limitation as to the method of depositing the electrically conductive films to become these electrodes; various known methods, such as a sputtering technique, a vacuum vapor deposition technique, and a plasma CVD technique, can be used. Also, there is no particular limitation as to the method of patterning electrically conductive films to form the first electrodes 11 and the second electrodes 12 which are interdigitated electrodes; known patterning methods such as photolithography can be used. The thicknesses of the first electrodes 11, the second electrodes 12, and the third electrode(s) 21 are typically 100 Å to 2000 Å.

The optical layer (display medium layer) 30 includes: a medium 31 in liquid form; and particles having shape anisotropy (hereinafter referred to as "anisotropically-shaped particles") 32, which are dispersed in the medium 31. The aforementioned first substrate 10 and second substrate 20 are attached together via a sealing portion (not shown) which is formed around the displaying region, such that the medium 31 and the anisotropically-shaped particles 32 are contained within a region that is surrounded by the sealing portion (i.e., the displaying region). There is no particular limitation as to the thickness (cell gap) of the optical layer 30. For example, the optical layer 30 may have a thickness of about 100 μm.

The anisotropically-shaped particles 32 are light reflective. The anisotropically-shaped particles 32 are in flake form (thin-strip shaped), for example.

The dielectric constant $\in_p$ of the anisotropically-shaped particles 32 and the dielectric constant $\in_m$ of the medium 31 are unequal. In the present embodiment, the dielectric constant $\in_m$ of the medium 31 is greater than the dielectric constant $\in_p$ of the anisotropically-shaped particles 32.

The anisotropically-shaped particles 32 change their alignment directions in accordance with the direction of an electric field which is applied to the optical layer 30. In other words, the anisotropically-shaped particles 32 take different alignment directions depending on whether a longitudinal field is generated in the optical layer 30 by a first electrode 11 and a second electrode 12 and the third electrode 21, or a lateral field is generated in the optical layer 30 by a first electrode 11 and a second electrode 12. Since the anisotropically-shaped particles 32 have shape anisotropy, if the alignment direction of the anisotropically-shaped particles 32 changes, the projected area of each anisotropically-shaped particle 32 onto the substrate plane (the substrate plane of the first substrate 10) also changes, whereby the reflectance of the optical layer 30 changes accordingly. The display device 110 of the present embodiment takes advantage of this to perform displaying.

Hereinafter, the reason why the alignment direction of the anisotropically-shaped particles 32 changes in accordance with the direction of an applied field will be described more specifically.

As shown in FIGS. 1(a) and (b), the display device 110 further includes relay circuits (switching circuits) 41 and 42 for switching the direction of an electric field applied to the optical layer 30, and a first power source 51 and a second power source 52.

As shown in FIG. 1(a), when the relay circuits 41 and 42 allow a first electrode 11 and a second electrode 12 and the third electrode(s) 21 to be connected to the first power source 51, a predetermined voltage is applied between the first electrode 11 and second electrode 12 and the third electrode(s) 21, whereby a longitudinal field is applied to the optical layer 30. FIG. 1(a) shows lines EF that are parallel to the electric lines of force (FIG. 1(b)). As can be seen from FIG. 1(a), when a longitudinal field is generated, the electric lines of force (lines EF) are substantially perpendicular to the substrate plane of the first substrate 10 (i.e., substantially parallel to the thickness direction of the optical layer 30).

On the other hand, as shown in FIG. 1(b), when the relay circuits 41 and 42 allow a first electrode 11 and a second electrode 12 to be connected to the second power source 52, a predetermined voltage is applied between the first electrode 11 and the second electrode 12, a lateral field is generated in the optical layer 30. As can be seen from FIG. 1(b), when a lateral field is generated, the electric lines of force (lines EF) include components which are substantially parallel to the substrate plane of the first substrate 10 (i.e., substantially perpendicular to the thickness direction of the optical layer 30).

When a longitudinal field is generated in the optical layer 30, the anisotropically-shaped particles 32 are aligned so as to be (in terms of their longitudinal direction) substantially perpendicular to the substrate plane of the first substrate 10, as shown in FIG. 1(a). In other words, a large part of the incident ambient light is transmitted through the optical layer 30. That is, the optical layer 30 takes a transparent state. Since the ambient light which is transmitted through the optical layer 30 is absorbed by the optical absorption layer 14, this state attains black displaying.

On the other hand, when a lateral field is generated in the optical layer 30, the anisotropically-shaped particles 32 are aligned so as to be (in terms of their longitudinal direction) substantially parallel to the substrate plane of the first substrate 10. Therefore, a large part of the incident ambient light is reflected by the anisotropically-shaped particles 32 in the optical layer 30. That is, the optical layer 30 takes a reflecting state; this state attains white displaying. Note that gray scale displaying also becomes possible by applying a relatively low voltage.

Figure 3:
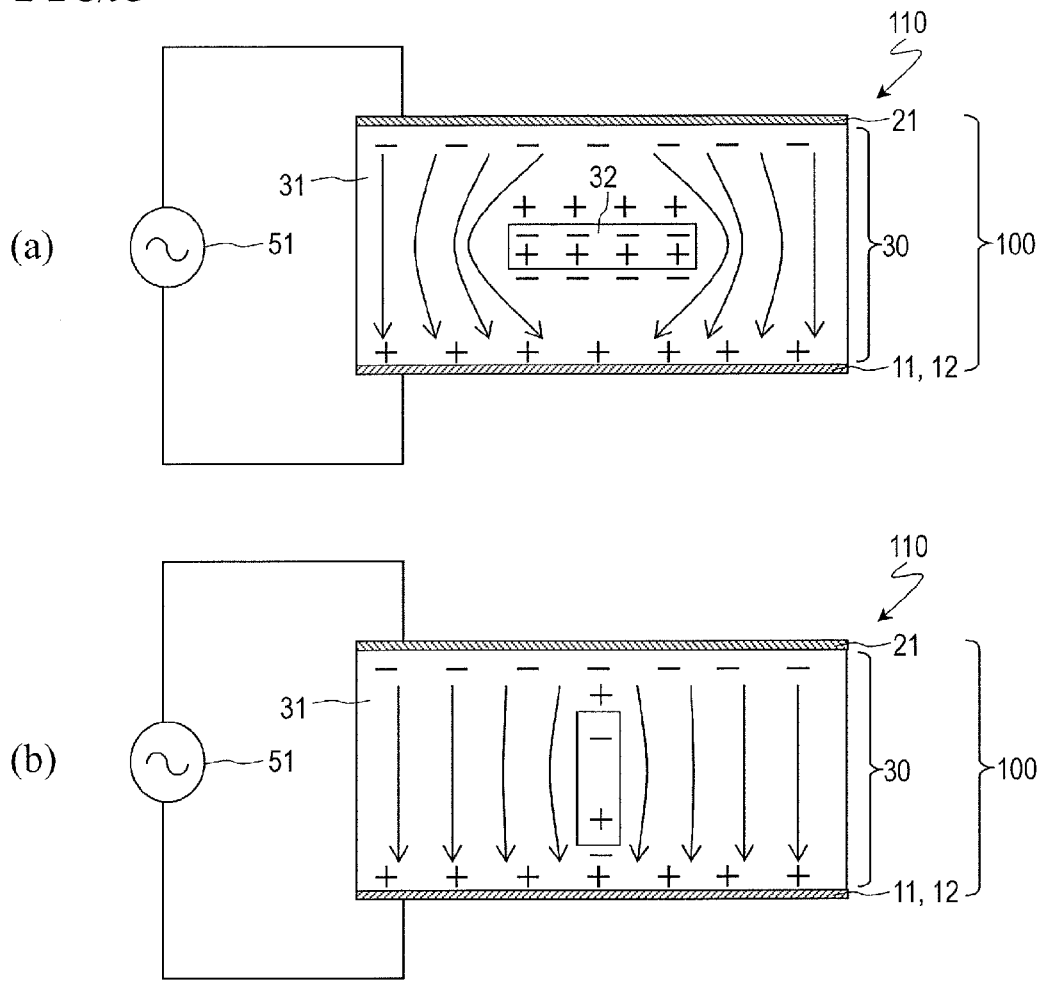
FIG. 3 (a) is a diagram showing how the optical layer 30 may appear immediately after the electric field to be applied to the optical layer 30 is changed from a lateral field to a longitudinal field; and (b) is a diagram showing how the optical layer 30 may appear after the lapse of a sufficient time therefrom.

Such changes in the alignment of the anisotropically-shaped particles 32 as described above owe to dielectrophoretic forces. Hereinafter, this will be described more specifically with reference to FIGS. 3(a) and (b). FIGS. 3(a) and (b) are diagrams showing how the optical layer 30 may appear (electric charge distribution and electric line of force), immediately after the electric field to be applied to the optical layer 30 is changed from a lateral field to a longitudinal field, and after the lapse of a sufficient time therefrom.

In the case where the dielectric constant $\in_p$ of the anisotropically-shaped particles 32 and the dielectric constant $\in_m$ of the medium 31 are unequal, when the direction of the applied field in the optical layer 30 changes, a large distortion will occur in the electric lines of force, as shown in FIG. 3(a). Therefore, as shown in FIG. 3(b), the anisotropically-shaped particles 32 rotate so as to result in the smallest energy.

Generally speaking, a dielectrophoretic force $F_{dep}$ acting on particles which are dispersed in a medium is expressed by formula (1) below, where $\in_p$ is the dielectric constant of the particles, $\in_m$ is the dielectric constant of the medium, a is the radius of the particles, and E is the intensity of the electric field. Note that Re in formula (1) is an operator for extracting the real part.

[math. 1]

$$F_{dep} = 2\pi \in_m \cdot a^3 \cdot Re \cdot [\in_p + 2\in_m/\in_p - \in_m] \cdot \nabla |E|^2 \qquad (1)$$

As described above, the display device 110 of the present embodiment performs displaying by switching between a state in which a longitudinal field is generated in the optical layer 30 and a state in which a lateral field is generated in the optical layer 30. The change from the former state to the latter state, and the change from the latter state to the former state, are both achieved by changing the direction of an applied field, and thus a sufficient response speed can be realized unlike in the optical devices of Patent Documents 1 and 2.

Moreover, the first electrodes 11 and the second electrodes 12 for generating a lateral field in the optical layer 30 are interdigitated electrodes which are provided on the first substrate 10, and, unlike the ITO layers in the suspended particle device 800 of Patent Document 3, are not electrodes extending along the cell thickness direction. Therefore, the display device 110 of the present embodiment is free from the problem of complicating the processes of forming the electrodes.

Incidentally, in International Publication No. 2013/108899, the applicant of the present application disclose a display panel (display device) which controls the alignment direction of anisotropically-shaped particles by switching the frequency of an applied voltage. For referencing sake, the entire disclosure of International Publication No. 2013/108899 is incorporated herein by reference. In this display panel, the anisotropically-shaped particles are aligned substantially perpendicular to the substrate plane when a high-frequency voltage is applied, and the anisotropically-shaped particles are aligned substantially parallel to the substrate plane when a low-frequency voltage or a DC voltage is applied. However, in the case where a DC voltage is applied as in this display panel, displaying problems may occur due to non-uniform distribution of electric charges.

On the other hand, the display device 110 of the present embodiment is able to switch between a transmitting state and a reflecting state of the optical layer 30 via usual AC driving (e.g., 60 Hz). Therefore, no displaying problem occur due to non-uniform distribution of electric charges.

As described above, the display device 110 of the present embodiment (display panel 100) is able to achieve a high contrast ratio and a high efficiency of light utilization with a simple constitution.

Moreover, the inventors investigated into the relationship between the electrode structure of the first substrate 10 and the alignment of the anisotropically-shaped particles 32, to find that the anisotropically-shaped particles 32 can be aligned in a stable manner under application of a lateral field to the optical layer 30 when predetermined relationships are satisfied by the width $w_1$ of each branch 11a of the first electrode 11, the width $w_2$ of each branch 12a of the second electrode 12, the interspace (interelectrode distance) g between branches 11a of the first electrodes 11 and branches 12a of the second electrodes 12, and the length (size along the longitudinal direction) l of the anisotropically-shaped particles 32.

Figure 4:
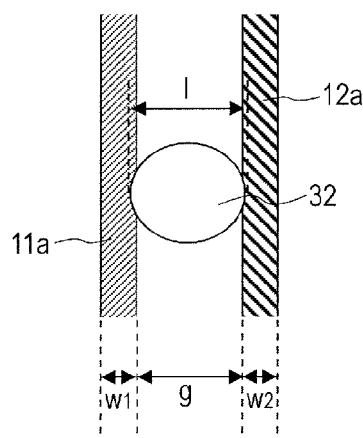
FIG. 4 A plan view showing an alignment of anisotropically-shaped particles 32 when a lateral field is applied to the optical layer 30.

Specifically, when formulae (2), (3), and (4) below are satisfied, as shown in FIG. 4, the anisotropically-shaped particles 32 can be stably aligned so as to be substantially parallel to the substrate plane, in a manner of straddling the branches 11a of the first electrodes 11 and the branches 12a of the second electrodes 12. This has been experimentally confirmed to be true. Note that FIG. 4 (and FIG. 5, as will be described later) illustrates anisotropically-shaped particles 32 which are in flake form (or more specifically, disk-shaped).

$$w_1 < l \quad (2)$$

$$w_2 < l \quad (3)$$

$$g \leq l \leq w_1 + w_2 + g \quad (4)$$

When formulae (2) and (3) are not satisfied, that is, when the length l of the anisotropically-shaped particles 32 is equal to or less than the width $w_1$ of each branch 11a of the first electrode 11 or the width $w_2$ of each branch 12a of the second electrode 12, phenomena may occur such as drifting or rotating of the anisotropically-shaped particles 32, thus resulting in an unstable alignment.

Also when formula (4) is not satisfied, that is, when the length l of the anisotropically-shaped particles 32 is smaller than the interelectrode distance g, or is greater than a total of the width $w_1$ of each branch 11a of the first electrode 11, the width $w_2$ of each branch 12a of the second electrode 12, and the interelectrode distance g, similar phenomena may occur, thus resulting in an unstable alignment.

Moreover, the inventors have also found that the anisotropically-shaped particles 32 can be stably aligned under application of a longitudinal field to the optical layer 30 when predetermined relationships are satisfied by the width $w_1$ of each branch 11a of the first electrode 11, the width $w_2$ of each branch 12a of the second electrode 12, the interelectrode distance g, and the length l of the anisotropically-shaped particles 32.

Figure 5:
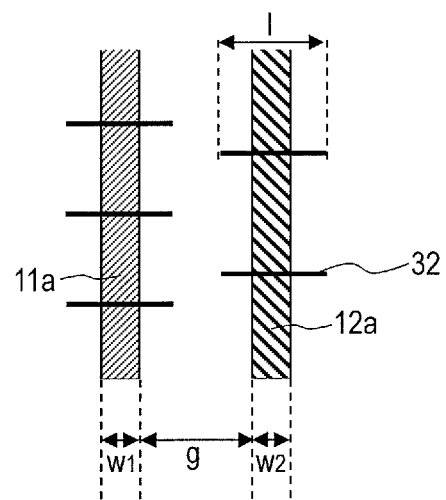
FIG. 5 A plan view showing an alignment of anisotropically-shaped particles 32 when a longitudinal field is applied to the optical layer 30.

Specifically, when formulae (5) and (6) are satisfied, as shown in FIG. 5, the anisotropically-shaped particles 32 can be stably aligned so as to be substantially perpendicular to the substrate plane, such that their thickness direction is substantially parallel to the direction in which the branches 11a and 12a extend. This has also been experimentally confirmed to be true.

$$w_1 \leq l \leq 1.8 \, g \quad (5)$$

$$w_2 \leq l \leq 1.8 \, g \quad (6)$$

When formulae (5) and (6) are not satisfied, that is, when the length l of the anisotropically-shaped particles 32 is smaller than the width $w_1$ of each branch 11a of the first electrode 11 or the width $w_2$ of each branch 12a of the second electrode 12, or is greater than 1.8 times the interelectrode distance g, the anisotropically-shaped particles 32 may not align in a desired direction.

There is no particular limitation as to the specific shape and material of the anisotropically-shaped particles 32, so long as their projected area onto the substrate plane changes in accordance with the direction of the applied field in the manner described above. The anisotropically-shaped particles 32 may be in flake form (thin-strip shaped), or cylindrical or ellipsoidal form. From the standpoint of realizing a high contrast ratio, the anisotropically-shaped particles 32 are preferably shaped so that the ratio between the maximum projected area and the minimum projected area is 2:1 or more.

As the material of the anisotropically-shaped particles 32, a metal material, a semiconductor material, a dielectric material, or a composite material thereof can be used. The anisotropically-shaped particles 32 may be a multilayer dielectric film, or made of a cholesteric resin material. In the case where a metal material is used as the material of the anisotropically-shaped particles 32, an insulating layer (dielectric layer) is preferably formed on the surface of the anisotropically-shaped particles 32. Although the dielectric constant of a metal alone would be an imaginary number, forming an insulating layer (e.g., a resin layer or a metal oxide layer) on its surface will allow the anisotropically-shaped particles 32 made of the metal material to be treated as a dielectric. An insulating layer being formed on the surface will also provide the effects of preventing electrical conduction due to contact between anisotropically-shaped particles 32 being made of the metal material, coagulation due to physical interactions, and so on. As such anisotropically-shaped particles 32, the following can be used in the case where the metal material is aluminum, for example: aluminum flakes whose surface is coated with a resin material (e.g., an acrylic resin), aluminum flakes having an $SiO_2$ layer formed on its surface, aluminum flakes having an aluminum oxide layer formed on its surface, and so on. It will be appreciated that metal materials other than aluminum may also be used as the metal material. Moreover, the anisotropically-shaped particles 32 may be colored.

So long as formulae (2), (3), and (4) (and preferably also formulae (5) and (6)) are satisfied, there is no particular limitation as to the length l of the anisotropically-shaped particles 32. Typically, the length l of the anisotropically-shaped particles 32 is about several μm to about several dozen μm (e.g., about 10 μm).

Also, there is no particular limitation as to the thickness of the anisotropically-shaped particles 32. However, the smaller the thickness of the anisotropically-shaped particles 32 is, the higher the transmittance of the optical layer 30 in a transparent state can be. Therefore, the thickness of the anisotropically-shaped particles 32 is preferably smaller than the interelectrode distance g (e.g., 4 μm or less), and more preferably equal to or less than the light wavelength (e.g., 0.5 μm or less).

The specific gravity of the anisotropically-shaped particles 32 is preferably equal to or less than 11 $g/cm^3$, more preferably equal to or less than 3 $g/cm^3$, and further more preferably about the same specific gravity as that of the medium 31. This is because, if the specific gravity of the anisotropically-shaped particles 32 is substantially different from the specific gravity of the medium 31, a problem may occur in that the anisotropically-shaped particles 32 may precipitate or float around.

The medium 31 is preferably a material having a high transparency with respect to visible light. Moreover, the viscosity of the medium 31 is preferably 5 mPa·s or less from the standpoint of response characteristics, and preferably 0.5 mPa·s or less from the standpoint of preventing precipitation of the anisotropically-shaped particles 32. Moreover, it is preferable that the specific gravity of the medium 31 is close to the specific gravity of the anisotropically-shaped particles 32. As the medium 31, for example, propylene carbonate, NMP (N methyl-2-pyrrolidone), brominated hydrocarbon (e.g., tetrabromoethane), fluorocarbons, silicone oils, or the like can be used.

Moreover, as will be understood from formula (1), the greater the difference ($|\in_p - \in_m|$) between the dielectric constant $\in_p$ of the anisotropically-shaped particles 32 and the dielectric constant $\in_m$ of the medium 31 is, the greater the dielectrophoretic force becomes, whereby response characteristics are improved. Therefore, the dielectric constant $\in_m$ of the medium 31 is preferably greater than the dielectric constant $\in_p$ of the anisotropically-shaped particles 32 by 1 or more, and more preferably by 10 or more. If the difference between the dielectric constant $\in_p$ of the anisotropically-shaped particles 32 and the dielectric constant $\in_m$ of the medium 31 is approximately zero, it may be difficult for the alignment direction of the anisotropically-shaped particles 32 to be changed. On the other hand, if the difference between the dielectric constant $\in_p$ of the anisotropically-shaped particles 32 and the dielectric constant $\in_m$ of the medium 31 is 1 or more, the alignment direction of the anisotropically-shaped particles 32 is changeable; if the difference between the dielectric constant $\in_p$ of the anisotropically-shaped particles 32 and the dielectric constant $\in_m$ of the medium 31 is about 5 to 10, the alignment direction of the anisotropically-shaped particles 32 is changeable in more suitable manners. Aluminum flakes whose surface is coated with an acrylic resin have a dielectric constant of 3.6, while propylene carbonate has a dielectric constant of 63. Therefore, when the aforementioned aluminum flakes are used as the anisotropically-shaped particles 32 and propylene carbonate is used as the medium 31, $|\in_p-\in_m|$ equals 59.4.

So long as formulae (2), (3), and (4) (and preferably also formulae (5) and (6)) are satisfied, there is no particular limitation as to the width $w_1$ of each branch 11a of the first electrode 11, the width $w_2$ of each branch 12a of the second electrode 12, and the interelectrode distance g.

Note that the width $w_1$ of each branch 11a of the first electrode 11 and the width $w_2$ of each branch 12a of the second electrode 12 may or may not be equal. In the case where the width $w_1$ of each branch 11a of the first electrode and the width $w_2$ of each branch 12a of the second electrode 12 are equal (i.e., $w_1=w_2=w$), the conditions under formulae (2), (3), and (4) above are expressed by formulae (7) and (8) below.

$$w<l \quad (7)$$

$$g \leq l \leq 2w+g \quad (8)$$

Similarly, the conditions under formulae (5) and (6) above are expressed by formula (9) below.

$$w \leq l \leq 1.8\,g \quad (9)$$

Although FIG. 2 illustrates an exemplary construction where the branches 11a of the first electrodes 11 and the branches 12a of the second electrodes 12 each extend in one direction (i.e., linearly), the branches 11a of the first electrodes 11 and the branches 12a of the second electrodes 12 may each be bent, for example, in a "<" shape.

Now, results of testing an actually-prototyped display device 110 will be described. In the prototype, disk-shaped aluminum flakes were used as the anisotropically-shaped particles 32, and propylene carbonate was used as the medium 31. The aluminum flakes used had a length l of 8 μm to 10 μm, with a thickness of 0.1 μm. The resin layer formed on the surface of the aluminum flakes had a thickness of 0.04 μm. The optical layer 30 had an aluminum flake content of 3% by weight. The branches 11a and 12a of the first electrodes 11 and the second electrodes 12, which were interdigitated electrodes, had widths $w_1$ and $w_2$ of 3 μm, with an interelectrode distance g of 8 μm.

Figure 6:
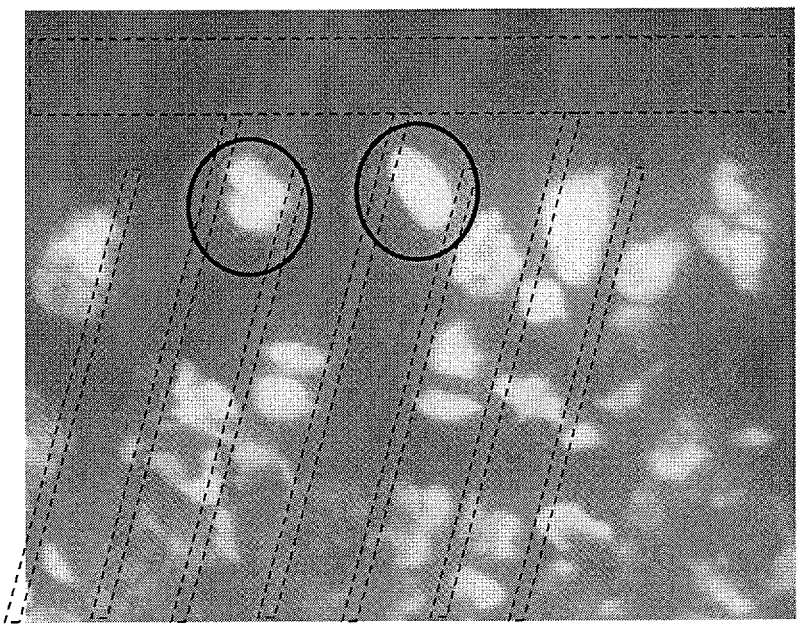
FIG. 6 (a) is a microscopic image showing an alignment when a lateral field (an AC voltage of 1 V) is applied to the optical layer 30 of a prototyped display device 110; and (b) is a microscopic image showing an alignment when a longitudinal field (an AC voltage of 1.5 V) is applied to the optical layer 30 of a prototyped display device 110.
Figure 6:
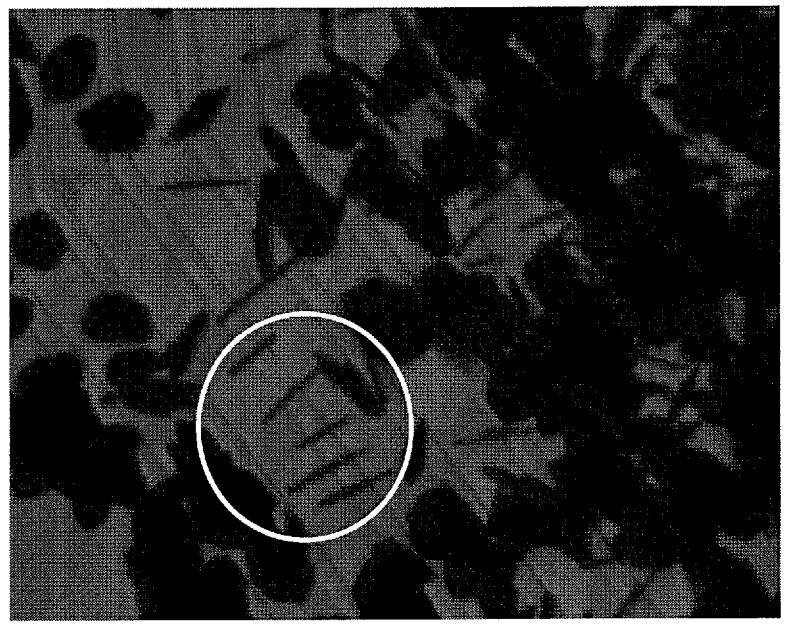

FIG. 6(a) is a microscopic image showing an alignment when a lateral field (an AC voltage of 1 V) is applied to the optical layer 30 of a prototyped display device 110. In FIG. 6(a), the outer shapes of the first electrodes 11 and the second electrodes 12 are indicated by dotted lines. As shown in FIG. 6(a), the anisotropically-shaped particles 32 are aligned so as to be substantially parallel to the substrate plane, and so as to straddle the branches 11a of the first electrodes 11 and the branches 12a of the second electrodes 12 (see the regions surrounded by circles in FIG. 6(a), for example).

FIG. 6(b) is a microscopic image showing an alignment when a longitudinal field (an AC voltage of 1.5 V) is applied to the optical layer 30 of a prototyped display device 110. As shown in FIG. 6(b), the anisotropically-shaped particles 32 are aligned so as to be substantially perpendicular to the substrate plane, in such a manner that their thickness direction is substantially parallel to the direction along which the branches 11a and 11b extend (notice the region surrounded by a circle in FIG. 6(b), for example).

Thus, it was confirmed that the alignment of the anisotropically-shaped particles 32 based on a longitudinal field and the alignment of the anisotropically-shaped particles 32 based on a lateral field can both be controlled through AC driving. Moreover, the applied voltage is about 1 V to about 1.5 V, which is lower than that of a generic liquid crystal display device. In other words, it can be said that the display device 110 of the present embodiment excels in terms of low power consumption.

Note that the level of the applied voltage needed for alignment also depends on the dielectric constant, viscosity, and the like of the medium 31 used. The values exemplified herein belong to the case where propylene carbonate is used as the medium 31.

Figure 7:
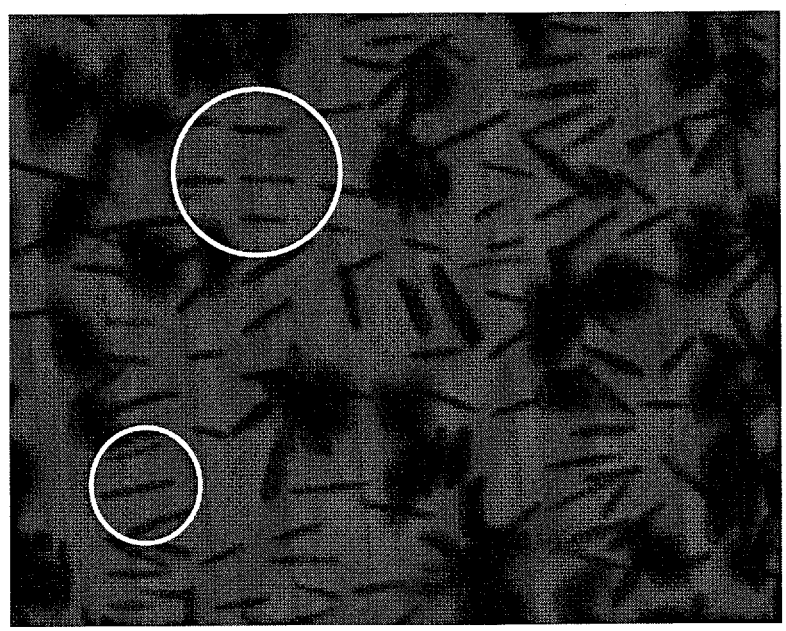
FIGS. 7 (a) and (b) are microscopic images showing alignments when a longitudinal field (an AC voltage of 1.5 V) is applied to the optical layer 30 of a prototyped display device 110, where: (a) shows a case where branches 11a of the first electrodes 11 and branches 12a of the second electrodes 12 are in linear shape; and (b) shows a case where branches 11a of the first electrodes 11 and branches 12a of the second electrodes 12 are in a "<" shape.
Figure 7:
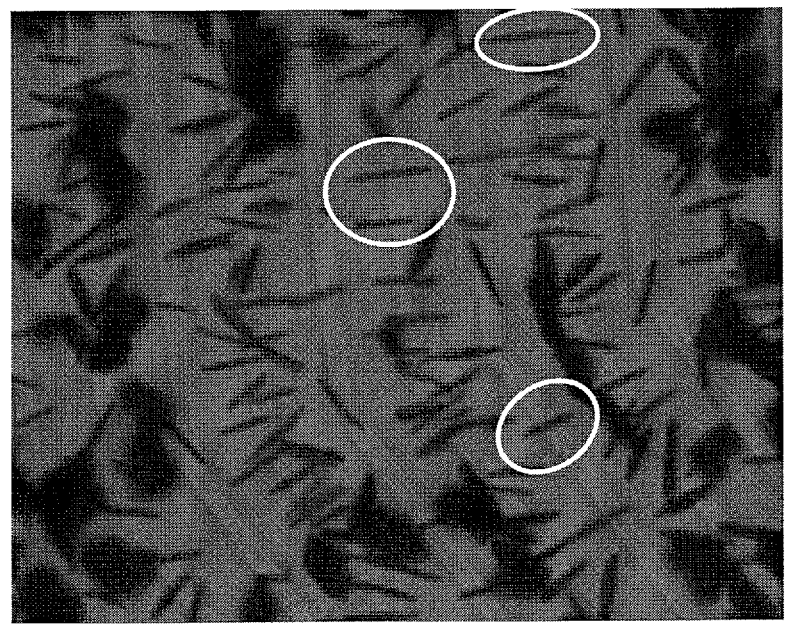

FIGS. 7(a) and (b) are also microscopic images showing an alignment when a longitudinal field (an AC voltage of 1.5 V) is applied to the optical layer 30 of the prototyped display device 110. However, FIG. 7(a) represents a case where the branches 11a of the first electrodes 11 and the branches 12a of the second electrodes 12 are in linear shape, whereas FIG. 7(b) represents a case where the branches 11a of the first electrodes 11 and the branches 12a of the second electrodes 12 are in a "<" shape.

In both cases of FIGS. 7(a) and (b), the anisotropically-shaped particles 32 are aligned so as to be substantially perpendicular to the substrate plane, in such a manner that their thickness direction is substantially parallel to the direction along which the branches 11a and 11b extend (notice the regions surrounded by circles in FIGS. 7(a) and (b), for example).

Thus, it has been confirmed that the alignment direction of the anisotropically-shaped particles 32 is also correlated with the direction along which the branches 11a and 12a of the first electrodes 11 and the second electrodes 12, which are interdigitated electrodes, extend.

The above description illustrates an exemplary construction where the first substrate 10, having the first electrodes 11 and the second electrodes 12 which are interdigitated electrodes, is disposed on the rear face side; however, the positioning of the first substrate 10 is not limited thereto. The first substrate 10 may be disposed on the front face side. Moreover, the specific circuit construction (the numbers of relay circuits and power sources and interconnections therebetween) for switching the direction of the electric field to be applied to the optical layer 30 is not limited to what is illustrated in FIGS. 1(a) and (b).

(Embodiment 2: Transmission Type Display Device)

FIGS. 8(a) and (b) show a display device 210 according to the present embodiment. FIGS. 8(a) and (b) are cross-sectional views schematically showing the display device 210.

As shown in FIGS. 8(a) and (b), the display device 210 includes a display panel 200, and has a plurality of pixels in a matrix array. Moreover, the display device 210 further includes a backlight (illuminator) 201 provided on the rear face side of the display panel (optical device) 200, thus being a transmission type display device which is capable of displaying in a transmission mode by utilizing light that is radiated from the backlight 201 toward the display panel 200.

Known backlights for display devices (e.g., those for liquid crystal display devices) can be used as the backlight 201. The backlight 201 may be an edge light type or a direct type. As a light source of the backlight 201, a cold-cathode tube (CCFL), a light-emitting diode (LED), or the like can be used.

The display panel 200 of the display device 210 according to the present embodiment differs from the display panel 100 of the display device 110 according to Embodiment 1 in that no optical absorption layer 14 is provided on the first substrate 10.

In the display device 210 of the present embodiment, too, the alignment direction of the anisotropically-shaped particles 32 is altered by changing the direction of the electric field applied to the optical layer 30.

Figure 8:
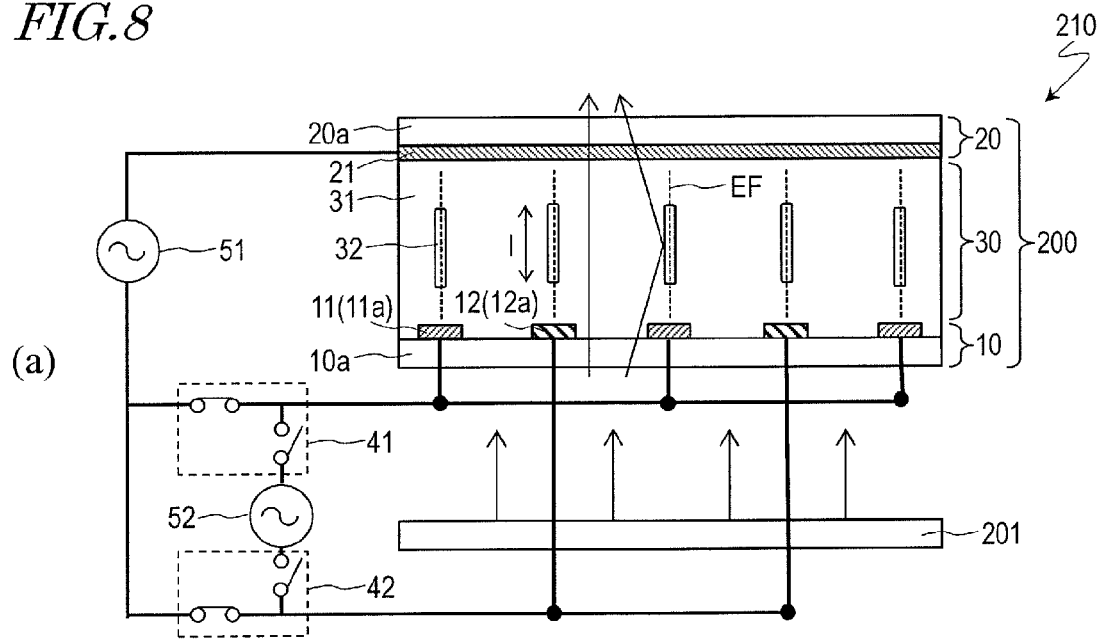
FIGS. 8 (a) and (b) are cross-sectional views schematically showing a display device 210 according to an embodiment of the present invention, where: (a) shows a state where a longitudinal field is applied to an optical layer 30; and (b) is a state where a lateral field is applied to the optical layer 30.
Figure 8:
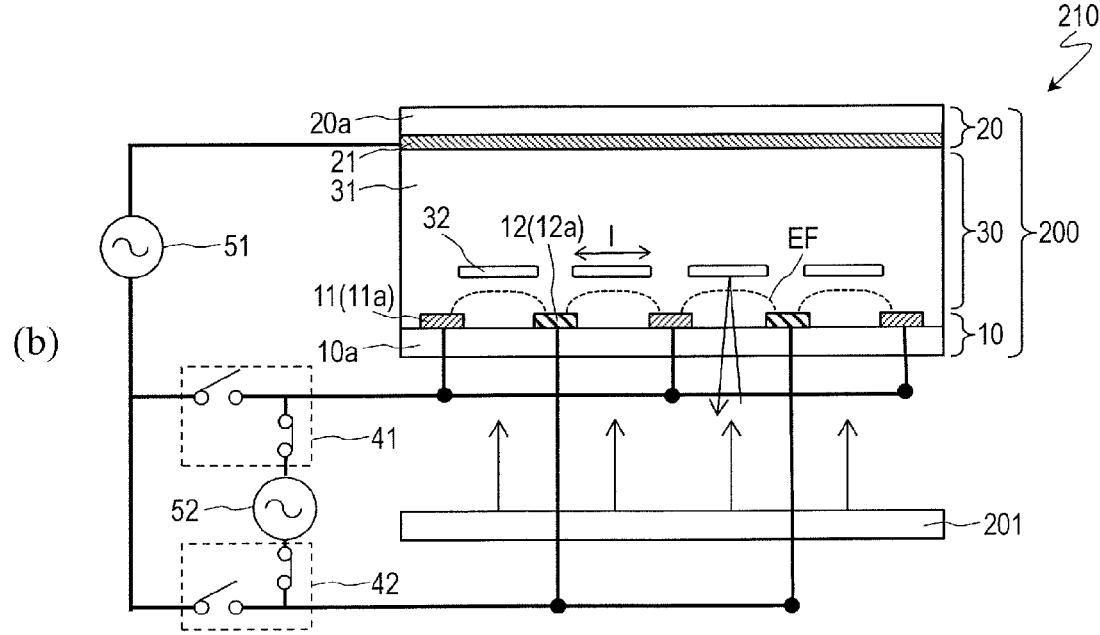
Figure 9:
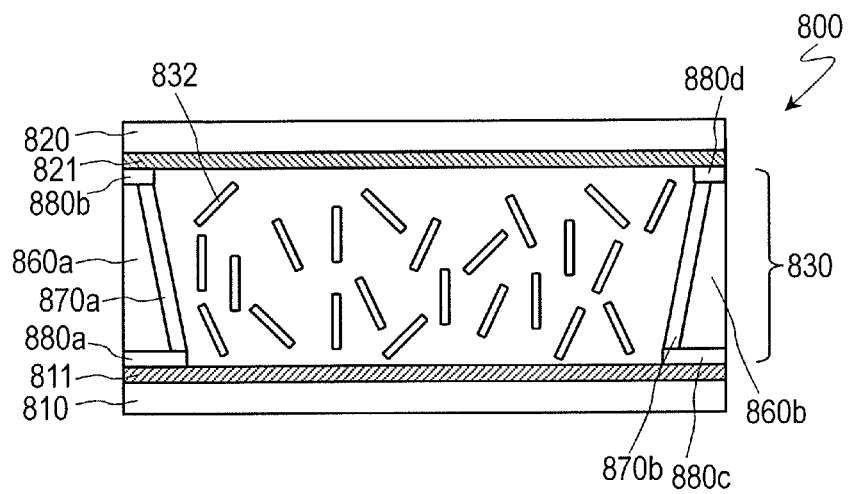
FIG. 9 A cross-sectional view schematically showing a suspended particle device 800 disclosed in Patent Document 3.

When a longitudinal field is generated in the optical layer 30, as shown in FIG. 8(*a*), anisotropically-shaped particles 32 are aligned so as to be (in terms of their longitudinal direction) substantially perpendicular to the substrate plane of the first substrate 10. Therefore, a large part of the light entering the optical layer 30 from the backlight 201 is transmitted through the optical layer 30. This state attains white displaying.

On the other hand, when a lateral field is generated in the optical layer 30, as shown in FIG. 8(*b*), the anisotropically-shaped particles 32 are aligned so as to be (in terms of their longitudinal direction) substantially parallel to the substrate plane of the first substrate 10. As a result, a large part of the light entering the optical layer 30 from the backlight 201 is reflected by the anisotropically-shaped particles 32 in the optical layer 30, so as not to exist toward the viewer. This state attains black displaying.

Thus, an optical device according to an embodiment of the present invention can be suitably used not only as the display panel of a reflection type display device, but also as the display panel of a transmission type display device. Moreover, an optical device according to an embodiment of the present invention also has applications other than display panels. An optical device according to an embodiment of the present invention can be any of various optical devices such as optical switches.

INDUSTRIAL APPLICABILITY

According to an embodiment of the present invention, there is provided an optical device which can achieve a high contrast ratio and a high efficiency of light utilization with a simple constitution. An optical device according to an embodiment of the present invention is suitably used as a display panel of a display device. Moreover, an optical device according to an embodiment of the present invention is also usable as various optical devices (e.g., optical switches) other than display panels.

REFERENCE SIGNS LIST

10 first substrate
10*a* substrate
11 first electrode (interdigitated electrode)
11*a* branch of first electrode
11*b* stem of first electrode
12 second electrode (interdigitated electrode)
12*a* branch of second electrode
12*b* stem of second electrode
14 optical absorption layer
20 second substrate
20*a* substrate
21 third electrode (spread electrode)
30 optical layer (display medium layer)
31 medium
32 anisotropically-shaped particles
41, 42 relay circuit (switching circuit)
51 first power source
52 second power source
100, 200 display panel (optical device)
201 backlight (illuminator)
110, 210 display device

The invention claimed is:

1. An optical device comprising:
   a first substrate and a second substrate opposing each other; and
   an optical layer between the first substrate and the second substrate, wherein
   the first substrate includes a first electrode and a second electrode,
   the second substrate includes a third electrode opposing the first electrode and the second electrode,
   the optical layer includes a medium and anisotropically-shaped particles dispersed in the medium, the anisotropically-shaped particles having shape anisotropy,
   each of the first electrode and the second electrode is an interdigitated electrode including a plurality of branches,
   the plurality of branches of the first electrode and the second electrode mesh with one another,
   an alignment direction of the anisotropically-shaped particles changes in accordance with a direction of an electric field applied to the optical layer, and
   the relationships $w_1 \leq l \leq 1.8g$, $w_2 \leq l \leq 1.8g$, and $g \leq l \leq w_1 + w_2 + g$ are satisfied, where $w_1$ is a width of each of the plurality of branches of the first electrode, $w_2$ is a width of each of the plurality of branches of the second electrode, g is a width of a space between interdigitated branches of the first electrode and the second electrode, and l is a length of the anisotropically-shaped particles.

2. The optical device of claim 1, wherein the alignment direction of the anisotropically-shaped particles differs depending on whether a longitudinal field is generated in the optical layer by the first electrode and second electrode and the third electrode or a lateral field is generated in the optical layer by the first electrode and the second electrode.

3. The optical device of claim 2, wherein,
   when a longitudinal field is generated in the optical layer, the anisotropically-shaped particles align substantially perpendicular to a substrate plane of the first substrate; and
   when a lateral field is generated in the optical layer, the anisotropically-shaped particles align substantially parallel to the substrate plane of the first substrate.

4. The optical device of claim 1, wherein the anisotropically-shaped particles are light reflective.

5. The optical device of claim 1, wherein the anisotropically-shaped particles are in flake form.

6. An optical device comprising:
   a first substrate and a second substrate opposing each other; and
   an optical layer between the first substrate and the second substrate, wherein the first substrate includes a first electrode and a second electrode, the second substrate includes a third electrode opposing the first electrode and the second electrode, the optical layer includes a medium and anisotropically-shaped particles dispersed in the medium, the anisotropically-shaped particles having shape anisotropy, each of the first electrode and the second electrode is an interdigitated electrode including a plurality of branches, the plurality of branches of the first electrode and the second electrode mesh with one another, an alignment direction of the anisotropically-shaped particles changes in accordance with a direction of an electric field applied to the optical layer, the relationships $w_1 < l$, $w_2 < l$, and $g \leq l \leq w_1 + w_2 + g$ are satisfied, where $w_1$ is a width of each of the plurality of branches of the first electrode $w_2$ is a width of each of the plurality of branches of the second electrode, g is a width of a space between interdigitated branches of the first electrode and the second electrode, and l is a length of the anisotropically-shaped particles, and a dielectric constant $\in_p$ of the anisotropically-shaped particles and a dielectric constant $\in_m$ of the medium are unequal.

7. The optical device of claim 6, wherein the dielectric constant $\in_m$ of the medium is greater than the dielectric constant $\in_p$ of the anisotropically-shaped particles by 1 or more.

8. The optical device of claim 6, wherein the alignment direction of the anisotropically-shaped particles differs depending on whether a longitudinal field is generated in the optical layer by the first electrode, the second electrode, and the third electrode or a lateral field is generated in the optical layer by the first electrode and the second electrode.

9. The optical device of claim 8, wherein, when a longitudinal field is generated in the optical layer, the anisotropically-shaped particles align substantially perpendicular to a substrate plane of the first substrate; and when a lateral field is generated in the optical layer, the anisotropically-shaped particles align substantially parallel to the substrate plane of the first substrate.

10. The optical device of claim 6, wherein the anisotropically-shaped particles are light reflective.

11. The optical device of claim 6, wherein the anisotropically-shaped particles are flakes.

12. A display device comprising:

a first substrate and a second substrate opposing each other;

a plurality of pixels in a matrix array on the first substrate; and an optical layer between the first substrate and the second substrate, wherein the first substrate includes a first electrode and a second electrode, the second substrate includes a third electrode opposing the first electrode and the second electrode, the optical layer includes a medium and anisotropically-shaped particles dispersed in the medium, the anisotropically-shaped particles having shape anisotropy, each of the first electrode and the second electrode is an interdigitated electrode including a plurality of branches, the plurality of branches of the first electrode and the second electrode mesh with one another, an alignment direction of the anisotropically-shaped particles changes in accordance with a direction of an electric field applied to the optical layer, and the relationships $w_1 < l$, $w_2 < l$, and $g \leq l \leq w_1 + w_2 + g$ are satisfied, where $w_1$ is a width of each of the plurality of branches of the first electrode $w_2$ is a width of each of the plurality of branches of the second electrode, g is a width of a space between interdigitated branches of the first electrode and the second electrode, and l is a length of the anisotropically-shaped particles.

13. The display device of claim 12 that displays in a reflection mode by utilizing exterior incident light.

14. The display device of claim 13, wherein one of the first substrate and the second substrate that is located on a rear face side includes an optical absorption layer which absorbs light.

15. The display device of claim 12 further comprising a backlight at a rear face side of the optical device, wherein the display device displays in a transmission mode by utilizing light which is radiated from the backlight toward the optical device.

* * * * *